United States Patent
Kuslich et al.

(10) Patent No.: US 6,434,799 B1
(45) Date of Patent: Aug. 20, 2002

(54) PIGTAIL FASTENER

(75) Inventors: Stephen D. Kuslich, 10343 Dellwood Rd. North, Stillwater, MN (US) 55082; Francis Peterson, Prescott, WI (US)

(73) Assignees: Stephen D. Kuslich, Stillwater, MN (US); Francis R. Peterson, Spooner, WI (US)

( * ) Notice: Subject to any disclaimer, the term of this patent is extended or adjusted under 35 U.S.C. 154(b) by 0 days.

(21) Appl. No.: 09/378,320

(22) Filed: Aug. 20, 1999

(51) Int. Cl.[7] .............................................. F16G 11/00
(52) U.S. Cl. .................. 24/131 R; 24/129 R; 24/115 N
(58) Field of Search ........................... 24/129 R, 131 R, 24/131 C, 129 C, 115 N, 129 B; 43/43.16, 44.83

(56) References Cited

U.S. PATENT DOCUMENTS

| | | | |
|---|---|---|---|
| 319,655 A | 6/1885 | Wright | 43/44.83 |
| 603,247 A * | 3/1898 | Becker | 70/458 |
| 1,062,365 A * | 5/1913 | Schulte | 24/131 R |
| 1,073,035 A * | 9/1913 | Fravel | 24/131 R |
| 1,495,912 A * | 5/1924 | Liefer | 24/18 |
| 1,713,041 A | 4/1929 | Fey | 43/44.86 |
| 1,890,829 A * | 12/1932 | Rundell | 24/131 R |
| 2,627,691 A | 2/1953 | Bress | 43/17.2 |
| 2,656,204 A * | 10/1953 | Blomstrand | 403/18 |
| 2,784,519 A | 3/1957 | Falston et al. | 43/44.98 |
| 2,847,220 A * | 8/1958 | Heffron et al. | 44/44.83 |
| 3,138,840 A * | 6/1964 | Rich | 24/131 R |
| 3,159,444 A | 12/1964 | Stine, Jr. | 339/45 |
| 3,939,594 A | 2/1976 | Wagner | 43/42.49 |
| 3,983,736 A * | 10/1976 | King, Jr. | 72/362 |
| 3,988,852 A | 11/1976 | Klein | 43/44 |
| 4,435,102 A * | 3/1984 | Smith | 403/206 |
| 4,640,212 A | 2/1987 | Brandt | 114/230 |
| 5,006,023 A * | 4/1991 | Kaplan | 411/17 |
| 5,050,813 A * | 9/1991 | Ishikawa et al. | 242/85.1 |
| 5,094,448 A | 3/1992 | Hackett | 272/93 |
| 5,113,616 A | 5/1992 | McManus | 43/44.85 |
| 5,157,861 A | 10/1992 | Peterson | 44/44.83 |
| 5,241,775 A | 9/1993 | Matsumura | 43/44.83 |
| 5,313,736 A | 5/1994 | Rosenberg et al. | 43/44 |
| 5,383,259 A | 1/1995 | McIntire | 24/300 |
| 5,457,909 A | 10/1995 | Graves | 43/44.91 |
| 5,636,413 A * | 6/1997 | Berg et al. | 24/131 R |
| 5,800,454 A * | 9/1998 | Jacobsen et al. | 606/191 |
| 5,809,687 A | 9/1998 | Rosenberg | 43/44 |
| 5,970,650 A | 10/1999 | Mammel | 42/44 |
| 5,987,707 A | 11/1999 | DeShon | 24/17 |
| 6,014,794 A | 1/2000 | McCoy | 24/300 |

FOREIGN PATENT DOCUMENTS

GB 2 100 103 A * 12/1982 ................ 42/43.16

* cited by examiner

Primary Examiner—Anthony Knight
Assistant Examiner—Ruth C. Rodriguez
(74) Attorney, Agent, or Firm—Vidas, Arrett & Steinkraus, P.A.

(57) ABSTRACT

The present invention includes an inventive pigtail fastener and the associated method of attaching line thereto. The pigtail fastener is comprised of an elongated shaft at the proximal end of the device and a tightly coiled portion of the shaft at the distal end of the device. The pigtail fastener is constructed and arranged in such a manner so as to provide an amount of tension sufficient to pinch and thereby secure a quantity of line between the coiled portion and the shaft. The tension being provided as a result of the narrow confines of the space between the shaft and the coiled portion or alternatively as a result of the coiled portion being biased against a portion of the shaft.

14 Claims, 10 Drawing Sheets

PIGTAIL FASTENER

CROSS-REFERENCE TO RELATED APPLICATIONS

Not Applicable

STATEMENT REGARDING FEDERALLY SPONSORED RESEARCH

Not Applicable

BACKGROUND OF THE INVENTION

This invention relates to a method and apparatus for attaching line to a unique fastener device. The inventive fastener has a unique line attachment portion which is constructed by shaping the end or ends of a shaft of metal or other material into a coiled or pigtail configuration. The pigtailed or coiled end-portion(s) may be provided with a springing action which would allow the coiled portion to be biased toward the shaft thereby frictionally engaging any line which has been attached to the fastener using the unique line attachment methods which will be described in detail below.

Previous line fastener devices typically required the user to have somewhat fine motor skills and manual-dexterity in order to quickly and properly thread and knot the line to the fastener. Furthermore, in addition to requiring skill and dexterity, in order to properly thread and tie a line to prior fastener types, the user of the hook must use both hands to properly complete the tying procedure. In addition, the nature and function of most fastener devices require that any knot formed between the fastener and the line be permanent, thus necessitating a cutting of the line in order to subsequently remove the fastener therefrom. Besides the damage associated with cutting the line, these fastener devices may otherwise place undesirable wear and tear on line as a consequence of their use. Finally, many fasteners are known which may allow line to slip or loosen which may be undesirable as well as dangerous.

The present pigtail fastener overcomes all of the well known shortcomings described above. The present pigtail fastener is designed to allow a user to quickly and easily tie a line to the fastener in a manner which results in a secure, non-slip line attachment which may just as quickly and easily be untied with minimal damage to the line.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

The invention provides for a shaft, particularly a shaft of a metal implement such as a fishhook, tent stake, carabineer or other device which one may desire to have a line attached to. The shaft has an end which is shaped into a pigtail configuration. The unique pigtail fastener will typically include a tightly coiled end portion of the implement shaft which is configured so that at least one point from the coiled portion contacts or is immediately adjacent to the shaft.

The attachment device may allow for a space between the coiled portion and the shaft or the coiled portion and shaft may be pressed together as a result of the tension provided by the coiled portion. Where a space is provided for, the space may be uniformly narrow or may include a more constricted portion. The space provided must be sufficiently narrow so that when line is drawn into the space as described herein, the various loops of line will be tightened against one another as a result of the close proximity of the coiled portion and the shaft. In this later embodiment the coiled portion and the shaft may exhibit some springing characteristics but will preferably be fairly rigid relative to one another.

The attachment device is constructed so that the coiled portion exhibits a sufficient amount of tension toward the shaft so that when line is drawn between the coiled portion and the shaft the line will be pinched and securely held as a result of the tension provided. The present pigtail fastener allows the user to secure line to the attachment device without the need to form a permanent knot with the line. An example of an appropriate material from which to construct the pigtail fastener is spring steel.

In the various alternative embodiments of the pigtail fastener, the fastener may be further configured to include a lip or line guide to further assist a user in attaching a line to the fastener. In such an embodiment at least a section of the coiled portion is spaced slightly outward from the shaft, thereby providing an initial enlarged opening between the coiled portion and the shaft wherein the line will more readily be received into. The opening which receives the line then narrows to pinch the line in between the coiled portion and the shaft. The coiled portion may also be configured to include a line securement area which is which functions to lock line into a predetermined position.

In all of the embodiments of the present pigtail fastener, a line attachment device is provided for which allows a user to quickly affix a line to the fastener without the need to tie a permanent knot with the line. The pigtail fastener and the associated methods for affixing a line thereto also provide the user with the ability to secure a line to the attachment device with only limited manual dexterity and skill.

The present pigtail fastener is designed to facilitate a uniquely user friendly, highly effective method of affixing a line thereto simply by winding a length of line around the implement shaft and then pulling the wound line into the coiled portion in the manners described below.

The present attachment device may be utilized with other devices besides those mentioned above. For example, in the embodiment wherein the pigtail fastener is applied to a fishhook, other fishing related devices such as lures, weights, floats, etc, may be constructed to include the present attachment device. As a result, one or more devices could be attached to a given length of fishing line. On a larger scale, tent stakes, which may include pigtail fastener ends, could be secured to one end of a line while the other end is secured to a pigtail fastener or other device located on the tent surface. The pigtail fastener may be affixed to the ends of securement straps, ropes or cords to provide a strap which may be readily adjusted in length by securing an end pigtail fastener along the length of the strap. Many other devices may be incorporated or used in combination with the present pigtail fastener. Such devices will be apparent to one of ordinary skill in the art and are included within the scope of the present invention.

BRIEF DESCRIPTION OF THE SEVERAL VIEWS OF THE DRAWINGS

A detailed description of the invention is hereafter described with specific reference being made to the drawings in which.

DETAILED DESCRIPTION OF THE INVENTION

The inventive aspect of the present pigtail fastener focuses upon a unique coiled region located at the distal end of an elongate shaft which is constructed to pinch and secure a line therein. As shown in the various figures, the pigtail fastener is preferably a coiled shaft portion of a metal implement. However, it should be noted that an implement could be retrofitted to include a pigtail fastener. The pigtail fastener is preferably constructed from a metal such as spring steel which has been tightly coiled and is immediately proximate to the shaft.

Figure 1:
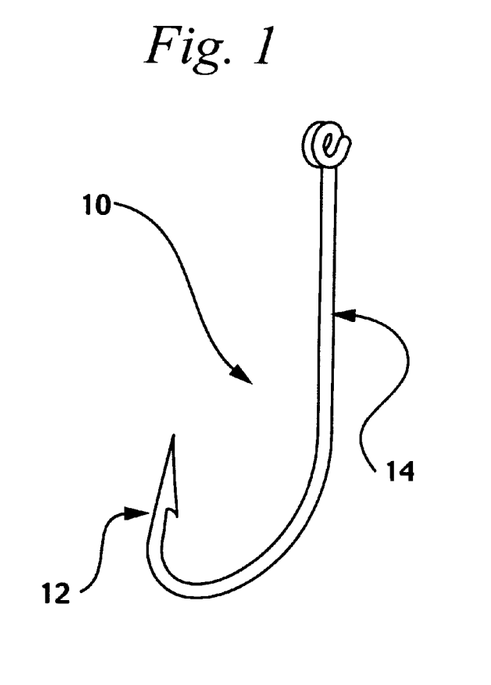
FIG. 1 is a perspective view of a fishhook embodiment of the present pigtail fastener.
Figure 2:
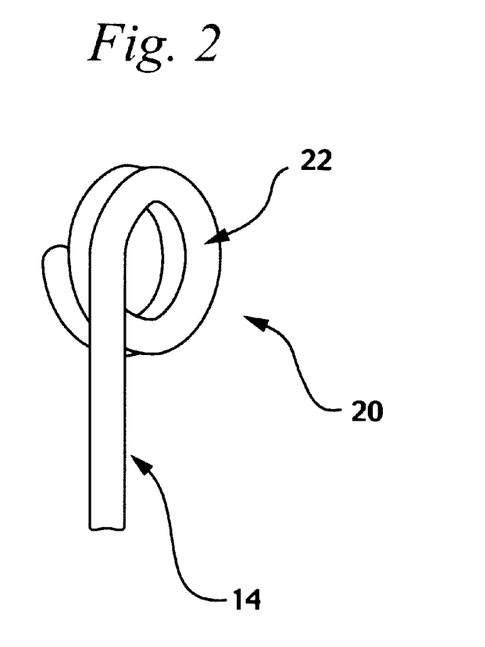
FIG. 2 is a close up view of a preferred embodiment of the pigtail fastener.

FIG. 1 shows the present pigtail fastener as incorporated into a fishhook embodiment. The fishhook 10 has a hook or barbed portion 12, a shaft 14 and a pigtail fastener 20. As better seen in FIG. 2 the preferred embodiment of the pigtail fastener 20 includes a shaft 14 that has been configured into a coil 22. The terms coil or coiled portion herein defines an extension of the shaft that has been shaped or molded or otherwise formed into an arc of at least 450 degrees. Preferably, the coil defines an arc which is 540 degrees or more. The arc which defines the coil may also be described as being roughly 1½ turns or loops of material extending from shaft 14. A coil which is within the parameters described provides a biasing force throughout the length of the arc defined and ensures that the apex 28 of the fastener has sufficient tension force to biasedly trap the line therein.

Figure 3:
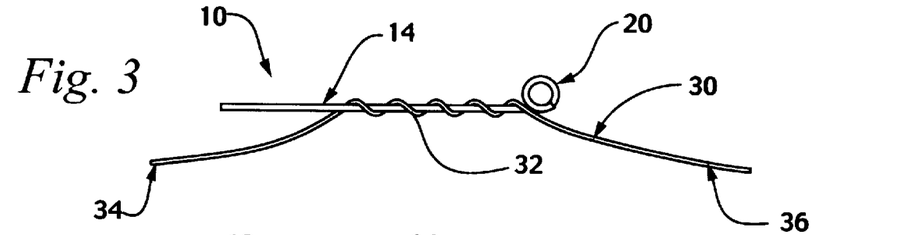
FIGS. 3–7 show the various steps of a first inventive method for securing a line to the pigtail fastener shown in FIG. 2.
Figure 4:
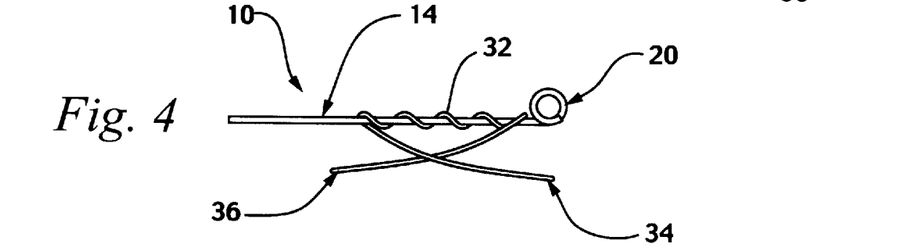

A first method for attaching a line to the pigtail fastener may be broken up into a series of steps as shown in FIGS. 3–7. FIG. 3 shows the initial step of winding a length of line 30 around the shaft 14 to form a plurality of loops 32 thereabout. FIG. 4 shows the second step which includes crossing the first end of the line 34 (the end of the line which may be secured to a fishing pole or other device) and the second end of the line 36 (the free end of the line) across each other relative to the loops 32 upon the shaft 14. This step may be accomplished by simply flipping the orientation of the fishhook 180 degrees relative to the initial placement of the first end of the line 34 and the second end of the line 36. Alternatively, if the fishhook is held in place by the user, the second end of the line 36 may be drawn toward the barb 12 and held against the fishhook by the user's thumb or finger(s) leaving the first end of the line 34 free to be drawn across the loops 32.

Figure 5:
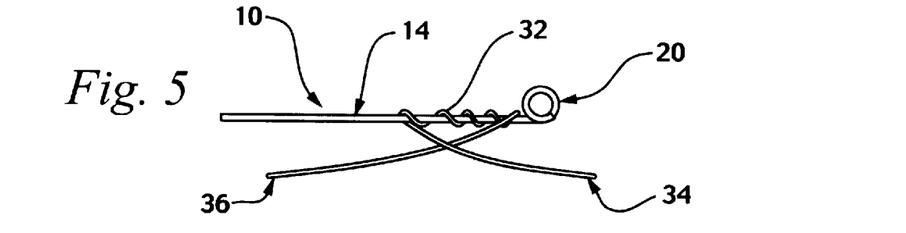

The third step of the line attachment method is shown in FIG. 5 and includes pulling the first end of the line 34 along the shaft 14 toward the pigtail fastener 20. A sufficient amount of tension must be placed upon the second end of the line 36 in order to prevent the line 30 from simply unwinding from the shaft 14 as the first end of the line 34 is pulled.

Figure 6:
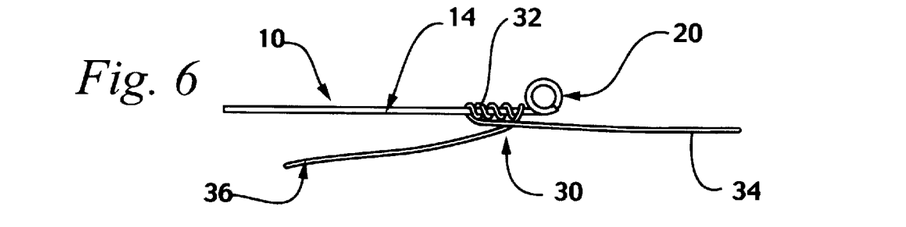

FIG. 6 shows the continued pulling of the first end of the line 34 toward the pigtail fastener 20. FIG. 6 also illustrates the tendency of the loops 32 to begin to entangle or bunch-up as the first end of the line 34 is pulled.

Figure 7:
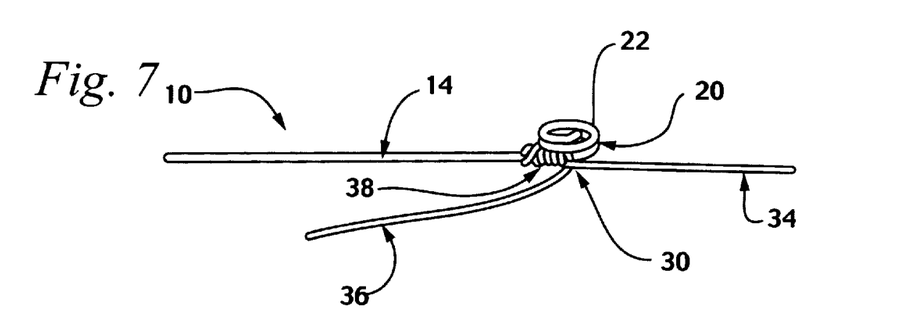

In FIG. 7, it can be seen that loops 32 have become bound together as a result of crossing and pulling both ends of the line, as well as a result of the tension provided by coil 22 pushing against the line and shaft 14. As a result of this tension or pinching action, and in combination with the constriction of loops 32, the line 30 begins to form a somewhat entangled mass 38 that is secured within coil 22 or between coil 22 and shaft 14.

Figures 8, 9:
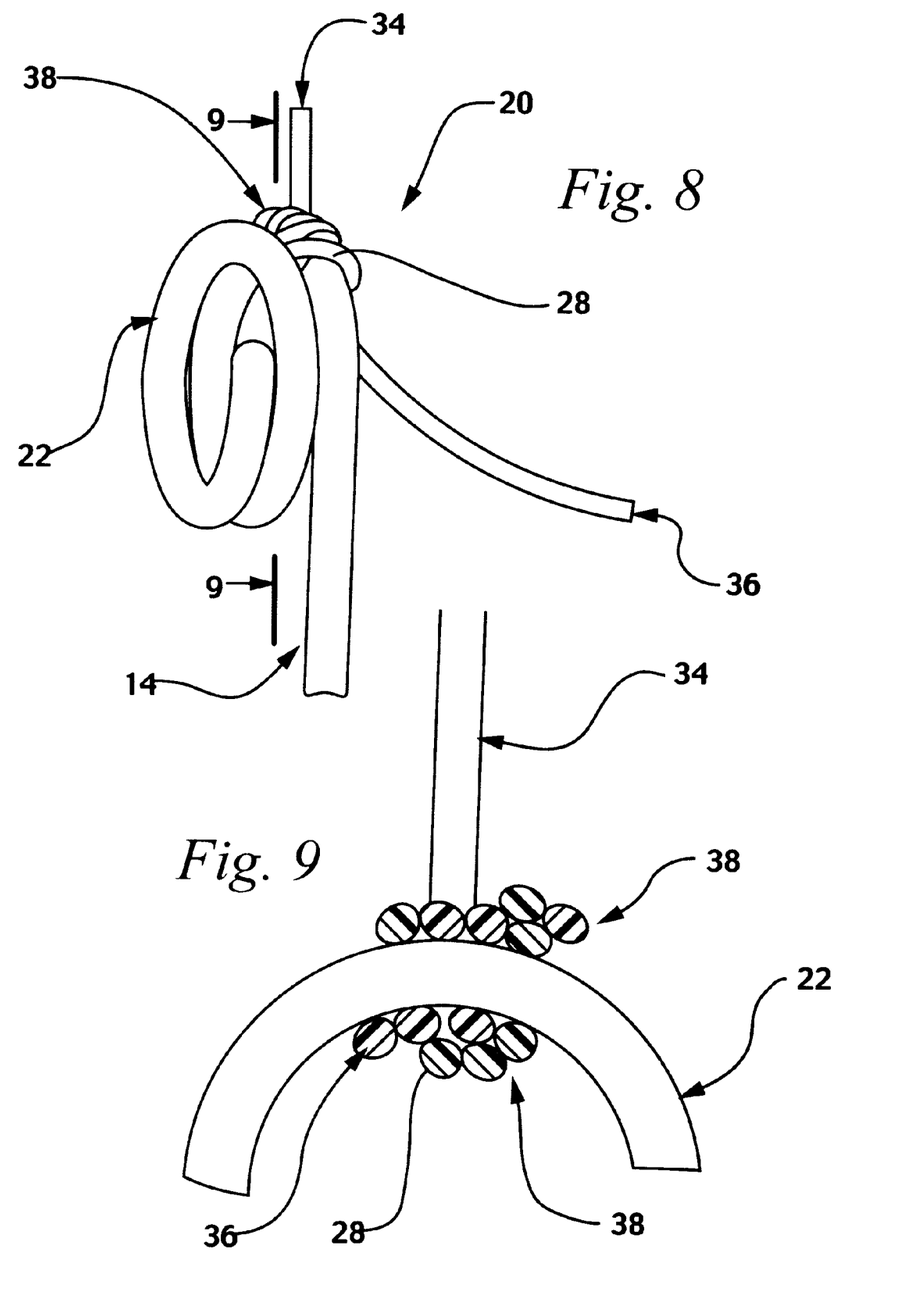
FIG. 8 is a perspective view of the preferred embodiment of the pigtail fastener and the line secured at the apex of the pigtail fastener.
FIG. 9 is a side view of the pigtail fastener shown in FIG. 8 showing the line in cross section.

In FIG. 8 the line is pulled taut in a direction toward coil 22 (away from shaft 14) and the line is continuously held tight by the pigtail fastener 20. The pinching action between the coil 22 and the shaft 14 secures allows the line 30 to be held securely within the pigtail fastener 20. Continued pulling upon the line 30 away from the shaft 14 will cause the entangled mass 38 to advance toward the apex 28 of the pigtail fastener 20 and to further tighten itself within the coil 22.

It should be noted that because of the unique shape and construction of the present invention, in all embodiments of the pigtail fastener, line may be pinched within the coil itself or between the shaft and that part of the coil immediately adjacent to the shaft. Where it is stated that the line is located or pinched between the coil and shaft it should be understood that the line may just as easily be held directly within the confines of the coil.

FIG. 9 further shows a cross-sectional view of the entangled mass 38 and helps to illustrate the tightening effect upon the various loops 32 resulting from continued pulling on the line.

Figure 10:
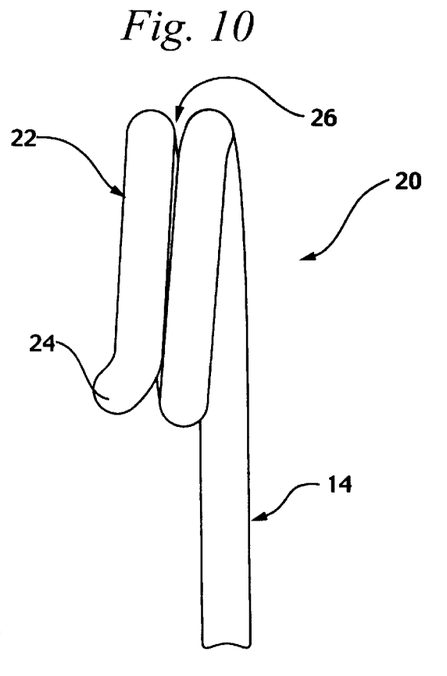
FIG. 10 is a side view of an embodiment of the pigtail fastener wherein the coils of the coiled portion are spaced apart a predetermined distance and the coiled portion includes an outwardly raised coil lip to assist in receiving line into the coiled portion.

As previously stated, the pigtail fastener may be embodied in several different forms incorporating a wide range of features. FIG. 10 shows an embodiment of the pigtail fastener which includes a lip portion 24 of coil 22 which is bent outward and protrudes away from the shaft 14. Lip portion 24 functions as a line guide which allows the coil 22 to readily catch and receive line which the user may desire to have pinched within the coil 22 but not necessarily against the shaft 14. As seen and described above, the method of attaching the line to the fastener shown in FIGS. 13–20, may employ a pigtail fastener having a lip portion such as is shown, or may employ alternative embodiments of the pigtail fastener such as the embodiment shown in FIG. 2.

It should also be noted that in an alternative embodiment the entire coil, as opposed to a lip portion alone, may be configured to be initially spaced away from the shaft to more readily catch and receive line between the coil and shaft.

The pigtail fastener shown in FIG. 10 also includes a coil 22 which is spaced away from the shaft 14 at apex 28 to define a gap 26. The gap 26 has a width which may be determined based on the diameter of line which is to be used with the pigtail fastener. An entangled mass of relatively large diameter line, such as described in the line tying methods above may require a larger gap 26 to ensure that the line will be pinched and held within the coil 22 without damaging the line or distorting coil 22. In a preferred embodiment where the pigtail fastener is constructed from spring steel, the coil 22 is intended to hold entangled mass of line 38 by providing a biasing force toward shaft 14. An undesirably large diameter line inserted into the pigtail fastener as described herein could distort and damage coil 22. By providing a gap 26 of appropriate width such potential damage and wear to the line and coil is avoided.

Turning now to FIGS. 13–20, a second inventive tying method is shown which is best utilized with a pigtail fastener having a lip portion as described above. FIGS. 13–16 show the various steps of the tying method from a rear perspective view of the pigtail fastener, while FIGS. 17–20 show the corresponding steps in a front perspective view of the pigtail fastener.

Unlike the previously discussed tying method shown in FIGS. 3–7, the present method does require that the line be threaded through the eyelet 42 of the coil 22. However, because the present tying method is highly suitable for use with relatively large embodiments of the pigtail fastener such as could be used with tent stakes, boating cleats, carabineers, etc, the eyelet 42 will typically be of such size that the speed and ease of tying the line to the fastener will not be reduced.

Figures 13, 14, 17, 18:
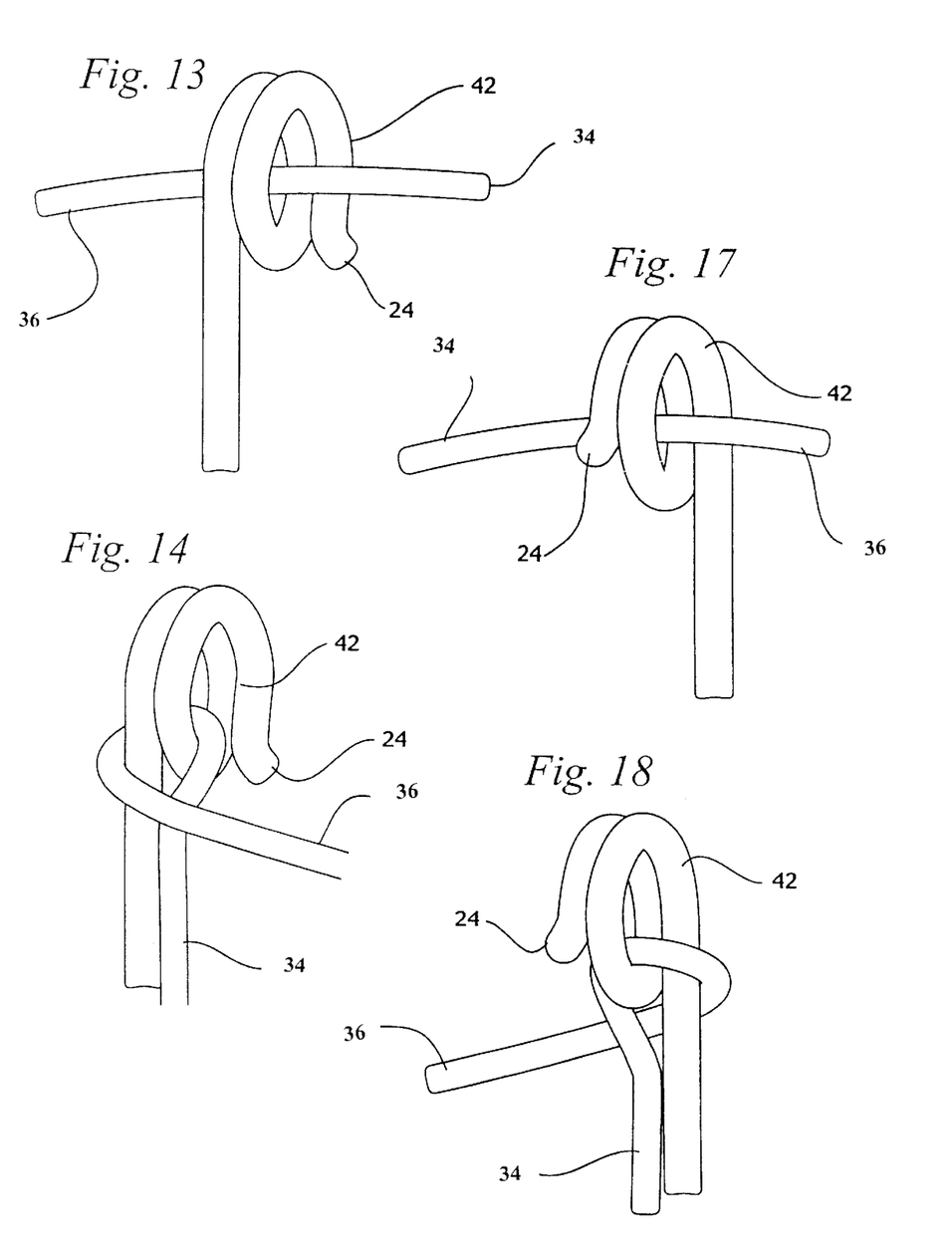
FIGS. 13–16 show in a rear perspective, the various steps of a second inventive method for securing a line to an embodiment of the pigtail fastener having a raised coil lip to assist in receiving line into the coiled portion.
FIGS. 17–20 show in a front perspective, the various steps of the line securing method shown in FIGS. 13–16.

As seen in FIGS. 13 and 17 the first step in tying a line 30 to the pigtail fastener 20 is to insert or thread the line 30 through the eyelet 42 of the coil 22. Preferably the first end of the line 34 is inserted into the eyelet 42 from the shaft-side of the pigtail fastener to the coil side as shown.

Figure 15:
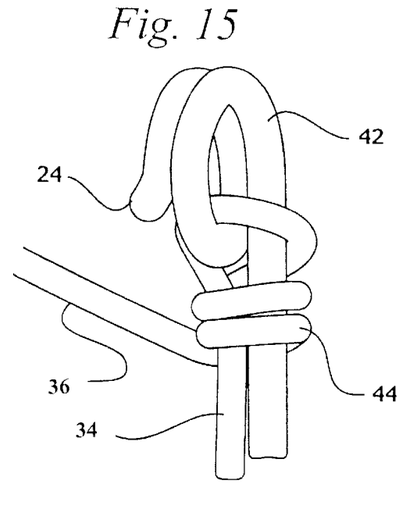
Figure 19:
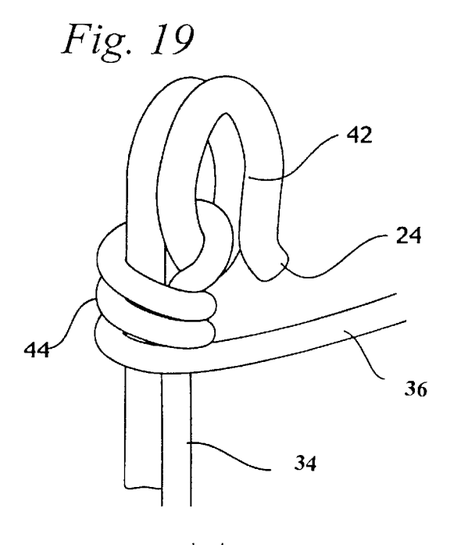

FIGS. 14 and 18 show the second step in the present tying method. The first end of the line 34 is pulled through the eyelet 42 to provide a length of line sufficient to lie against a portion of the shaft 14 below the coil 22. The user may secure the first end of the line 34 against the shaft 14 by any means. For example: if the user is holding the pigtail fastener by the shaft, the user could simply slide the first end of the line between his or her finger or thumb and press the line against the shaft. Once the first end of the line 34 is laid against the shaft 14, the second end of the line 36 is wound about the shaft 14 and the first end of the line 34 one or more times, preferably two or three times, as best seen in FIGS. 15 and 19.

Figure 16:
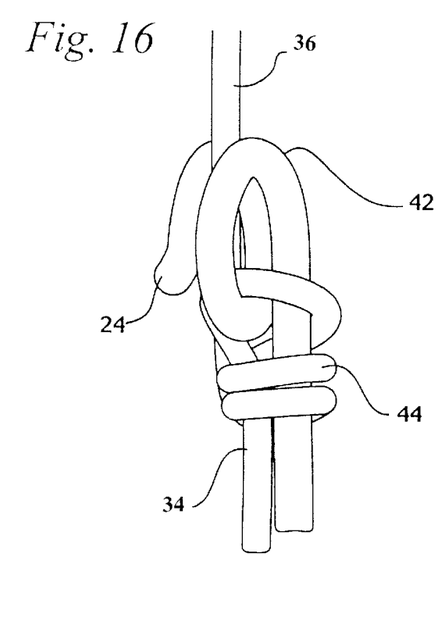
Figure 20:
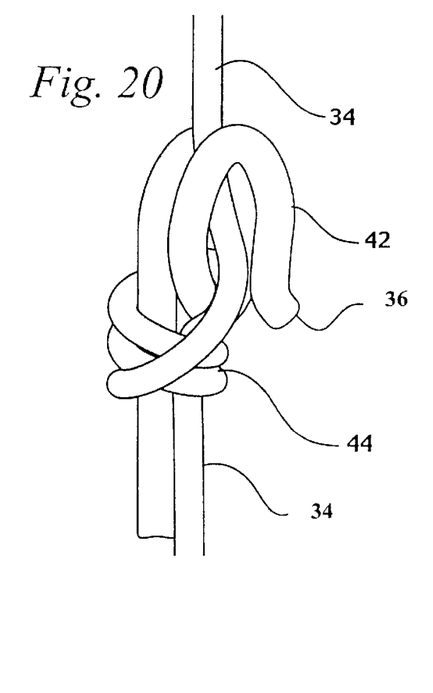

FIGS. 16 and 20 show the final step in the present tying method. After winding the second end of the line 36 about the shaft 14 and the first end of the line 34 as shown, the second end of the line 36 is drawn over the wound loops of line 44 and upward toward the coil 22. The second end of the line 36 is inserted into the coil 22 by being pulled between the lip portion 24 and the coil 22. The second end of the line 36 is drawn to its final position at the apex 28 of the coil 22.

The line 30 is easily removed from the coil 22 by pulling the second end of the line 36 downward from the lip portion 24. Once the second end of the line 36 is no longer retained by the coil 22 the line is simply unwound.

The tying method shown in FIGS. 13–20 and described above is especially appropriate when used with larger embodiments of the pigtail fastener which would utilize line such as relatively thick rope or cord.

The pigtail fastener and tying methods described above are an improvement over prior art fastener devices and tying methods. The embodiment disclosed provides a device which can be fastened to a line with relative ease requiring little manual dexterity or coordination from the user while still providing a strong secure connection between the fastener and line. In addition, the method of tying a line to the present pigtail fastener allows a user to tie a line to the fastener in just a few seconds regardless of external conditions.

Figure 11:
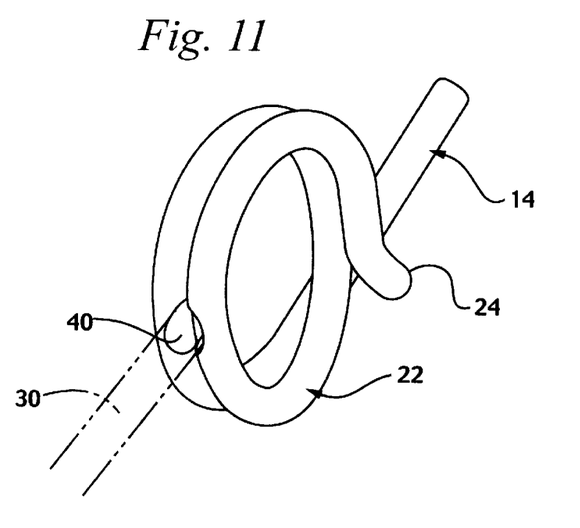
FIG. 11 is a perspective view of an embodiment of the pigtail fastener having a line securement area at the apex of the coiled portion.
Figure 12:
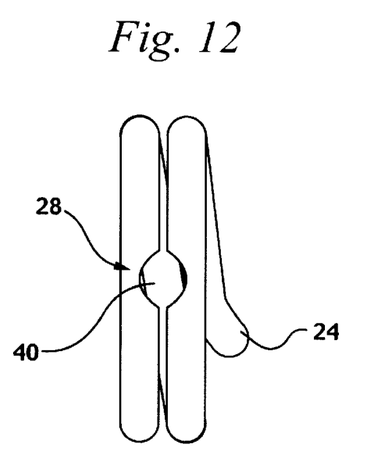
FIG. 12 is a top down view of the embodiment of the pigtail fastener shown in FIG. 11.
Figures 25, 26, 27:
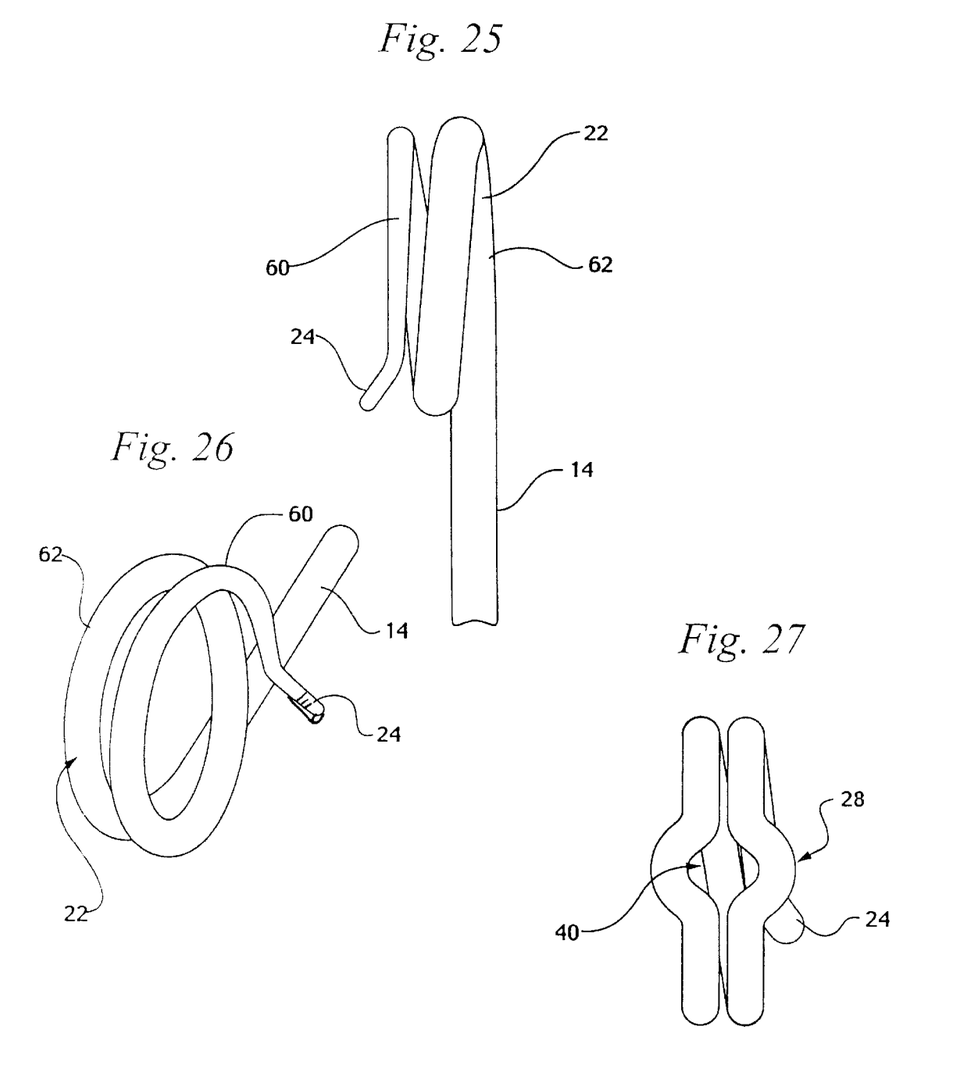
FIG. 25 shows a side view of an embodiment of the pigtail fastener wherein the coiled portion has a narrowed end region which as a reduced diameter relative to the remaining region of the coiled portion.
FIG. 26 shows a perspective view of the embodiment of the pigtailed fastener shown in FIG. 25.
FIG. 27 shows a top down view of an embodiment of the pigtail fastener wherein part of the coiled portion is shaped to form a line securement area at the apex of the coiled portion.

In a further embodiment of the pigtail fastener as shown in FIGS. 11 and 12, a line securement area 40 is notched or otherwise formed at a predetermined point within the coil 22. The line securement area provides a widened area which helps to secure the line 30 (seen only in FIG. 11). In the embodiment shown, the line securement area 40 corresponds with the apex 28 to ensure that the line 30 is guided in the direction opposite to the orientation of the shaft 14. The line securement area 40 is sized appropriately to retain a predetermined diameter of line therein. The location of the line securement area 40 at theapex 28 also helps secure the line within the coil 22 by preventing the line 30 from slipping in either direction away from the line securement area 40 even when force is not applied to the line as described in the tying method described above. In FIG. 27, an alternative embodiment is shown where line securement area 40 is formed by shaping or molding coil 22 to a desired shape and diameter, rather than forming the line securement area by notching the coil as previously shown in FIGS. 11 and 12. An advantage of the embodiment shown in FIG. 27 is that possible damage to the line resulting from friction and compression is further minimized as a result of the relatively smooth surface and contour of the shaped line securement area 40.

In the preferred embodiment where the coil is constructed from spring steel, the line may be slid into the line securement area by pulling the line upward toward the apex to momentarily distort the diameter of the line securement area so it may flexibly receive the line. The line may be removed from the line securement area by pulling on the line in a direction away from the line securement area with sufficient force to overcome the biasing force of the coil, thereby sliding the line out of the line securement area without damage to either the line or to the coil.

Figures 21, 22:
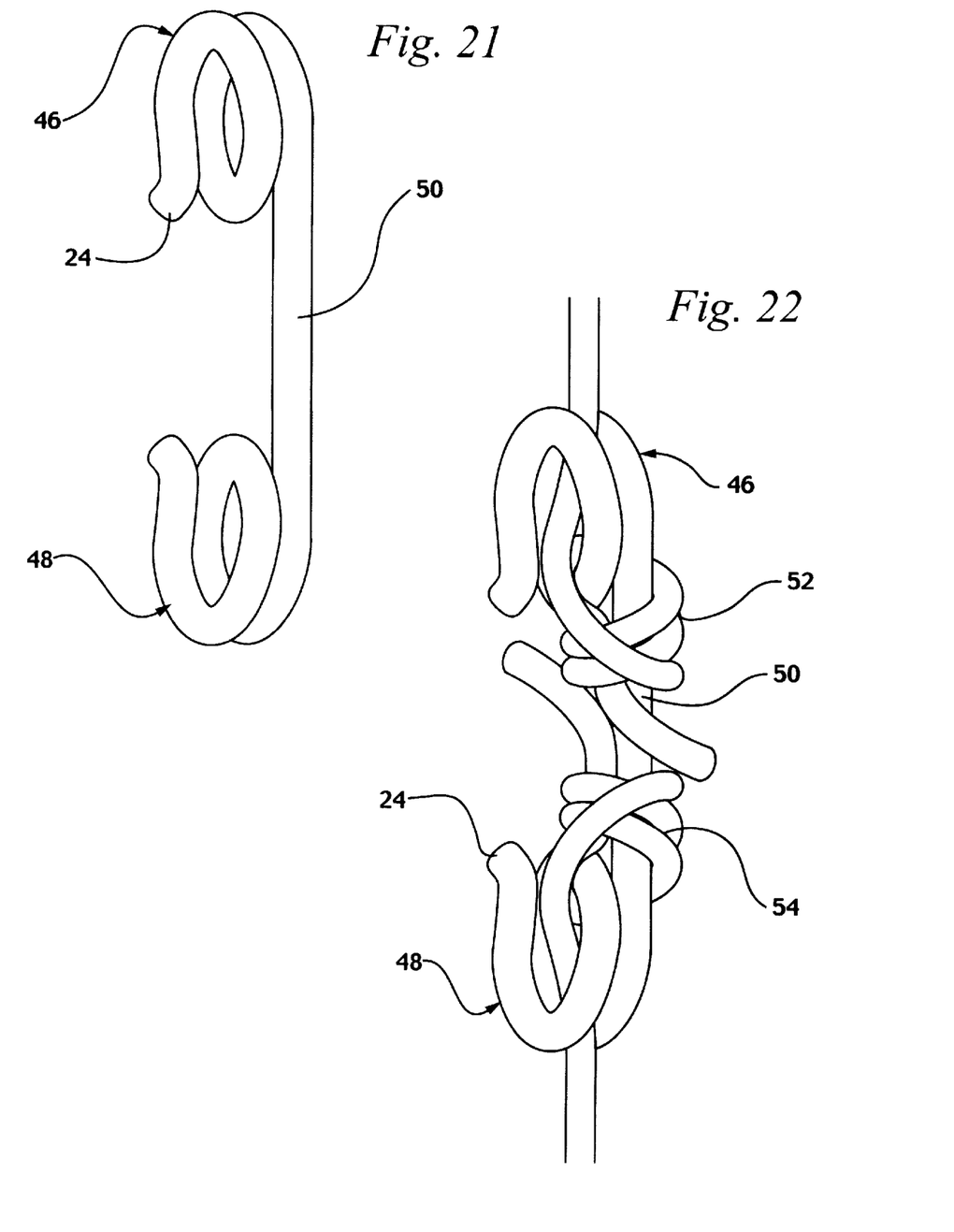
FIG. 21 shows a perspective view of an embodiment of the pigtail fastener which includes two coiled portions.
FIG. 22 shows the embodiment of the pigtail fastener shown in FIG. 22 with separate line ends secured to each coiled portion.

FIG. 21 shows an embodiment of the pigtail fastener wherein two coiled portions 46, 48 have been joined along a common shaft 50. Such an embodiment can be used to join multiple lines together. The embodiment shown can be used to connect an initial line 52 to a secondary line 54 as best shown by FIG. 22. The initial line 52 may be tied to the coiled portion 46. The secondary line 54 is tied to the coiled portion 48. The respective coiled portions and lines may be tied utilizing any tying method known but preferably with the methods described herein.

It should be understood by one of ordinary skill in the art that a multiple coiled portion embodiment of the pigtail fastener is not limited to only joining two coiled portions as described and shown herein. It may be desirable to attach numerous implements or lines to a common location. As such it is possible to join several coiled portions together around a common axial point or around a support ring or other device (not shown) either fixedly or moveably to provide for such common joining.

Figure 23:
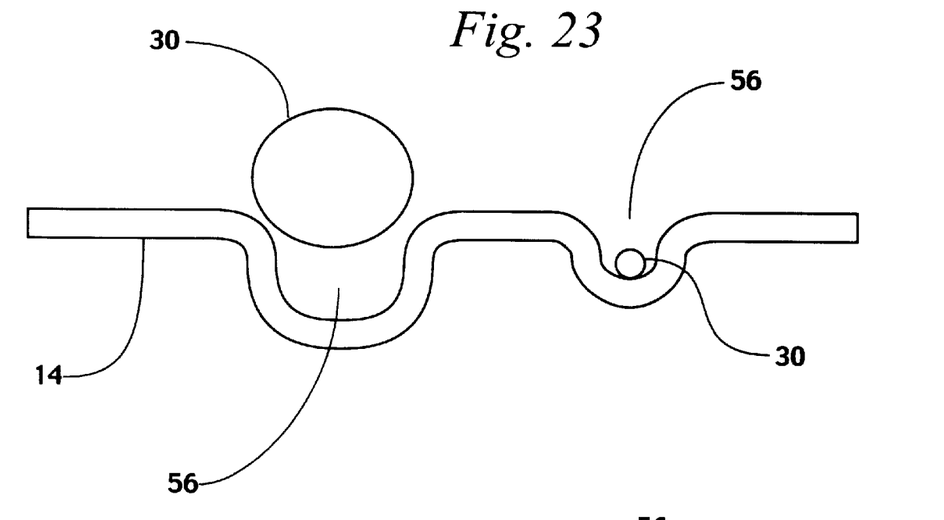
FIG. 23 shows a side view of an embodiment of the pigtail fastener wherein the shaft is bent or molded to include line diameter guides along a length of the shaft.
Figure 24:
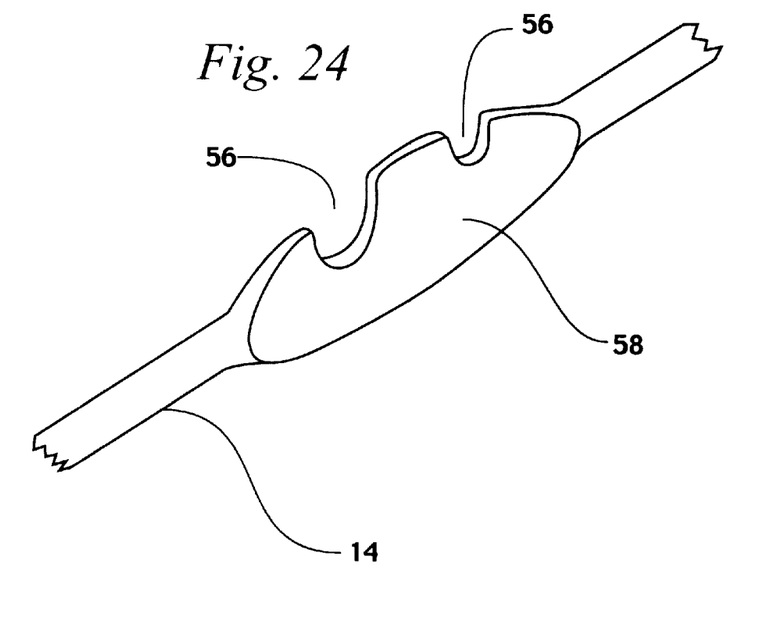
FIG. 24 shows a perspective view an embodiment of the pigtail fastener wherein the shaft has a flattened region, the flattened region including line diameter guides incorporated.

FIGS. 23 and 24 show in detail a line sizing feature which could be incorporated into nearly any embodiment of the present pigtail fastener. The line sizing feature includes one or more sizing areas 56 which correspond to the diameter of line which may or may not be properly used with the coiled portion (not shown) as described above. In FIG. 23 the sizing areas 56 are the result of bending the shaft 14 to the diameter desired. In the embodiment shown in FIG. 24 the shaft 14 has a flattened area 58 which includes the sizing areas 56. The sizing areas 56 may be cut, etched or otherwise placed into the flattened area 58. In the embodiment shown in FIG. 24 the sizing areas 56, may also be utilized as line cutters or trimmers by simply applying downward pressure against a line as it rests against the sizing area 56.

In certain applications of the present invention It may be desirable to use relatively fine or small diameter line with the pigtail fastener. An example of such an application may include the fishhook embodiment such as shown in FIG. 1. In such an application, coil 22 may have insufficient flexibility to adequately secure the reduced diameter line to the pigtail fastener 10 because the coil may be fairly rigid as a consequence of having a uniform and relatively large diameter when compared to the line. In order to provide the coil with adequate flexibility and springiness the coil may be equipped with an end region which has been flattened or reduced in diameter as illustrated in the embodiment shown in FIGS. 25–26.

In the embodiment shown in FIGS. 25 and 26 coil 22 is characterized has having a reduced diameter region and an initial region. Reduced diameter region 60 is characterized as being more flexible and more springy relative to initial region 62. As a result of these characteristics, the reduced diameter region will be more prone to push against initial region 62 than a coil having a larger uniform diameter. In the preferred embodiment shown reduced diameter region 60 defines an arc of at least 400 degrees however, in alternative embodiments this value may vary greatly depending on the diameter of the line, the physical characteristics of line being used, the method of attaching the line to the fastener, etc. Alternatively, it may be possible to retain reduced diameter line in an embodiment of the pigtail fastener which has a coil or region of the coil, whether reduced in diameter or not, manufactured from a material which is more flexible and springy than either the shaft or the initial region.

Figures 28, 29, 30:
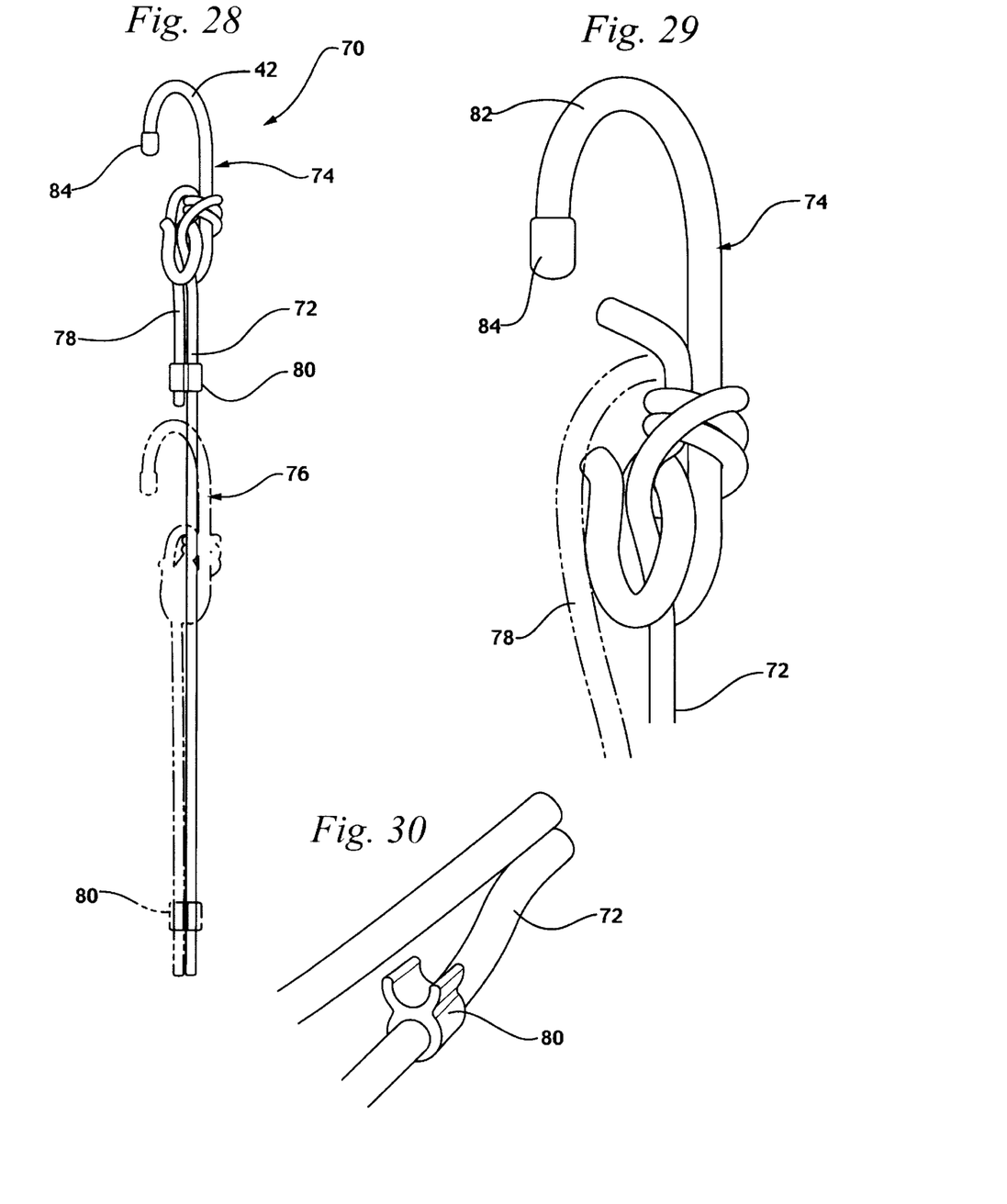
FIG. 28 shows an embodiment of the present invention wherein a cord length may be adjusted with pigtail fasteners located at each end of the cord, the pigtail fasteners being equipped with hooks having blunted ends.
FIG. 29 shows a close up view of an end of the cord and a respective pigtail fastener shown in FIG. 28.
FIG. 30 shows a close up view of a clip used in conjunction with the embodiment shown in FIG. 28 wherein the clip may retain excess cord which may result from the length of the cord being shortened.

In yet another embodiment of the present invention, an adjustable length securement strap, indicated generally at 70, is formed by combining a line with two pigtailed fasteners as shown in FIGS. 28 and 29. The line is preferably a shock or bungee cord 72 having a predetermined length, and is equipped with two pigtail fasteners 74, 76. The length of the securement strap may be infinitely adjusted by attaching the pigtail fasteners at desired points along the length of the bungee cord. In the embodiment shown, the bungee cord 72 is attached to the pigtail fasteners 74, 76 utilizing the method of attachment shown in FIGS. 13–20 and described above. However any method of attachment may be used. Excess cord 78 may be allowed to hang freely or is more preferably retained substantially parallel to bungee cord 72 by one or more retaining clips such as clip 80 shown in FIGS. 28 and 30.

As seen in FIGS. 28 and 29 the pigtail fasteners used in the securement strap embodiment preferably are equipped with a blunted hook 82 at the end of shaft 14. By providing the pigtail fasteners 74, 76 with blunted hooks 82 the securement strap may be hooked to a variety of surfaces without scratching or otherwise damaging such surfaces. In order to further ensure that the blunted hooks do not scratch or harm surfaces to which they are hooked, each blunted hook 82 may be equipped with a protective cap 84. Protective cap 84 may be constructed out of any suitable material such as plastic, rubber, etc.

It should be understood that in the embodiment shown in FIGS. 28–30 any type of line, pigtail fasteners and clips can be utilized.

This completes the description of the preferred and alternate embodiments of the invention. Those skilled in the art may recognize other equivalents to the specific embodiment described herein which equivalents are intended to be encompassed by the claims attached hereto.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

What is claimed is:

1. A pigtail fastener comprising a shaft, the shaft having a proximal portion and a distal portion, the distal portion defining a coiled portion which extends from and is adjacent to said proximal portion of the shaft, said coiled portion defining an arc of about 540 degrees or more, a distal end of the pigtail fastener defining an apex at the coiled portion, a line securement area being positioned at the apex, the line securement area defining a channel between two adjacent loops of the coiled portion, the channel defining a channel axis, the proximal portion defining a longitudinal axis, the coiled portion disposed about a coil axis, the longitudinal axis and the coil axis being substantially perpendicular to one another, the longitudinal axis and the channel axis being substantially parallel to one another.

2. The pigtail fastener of claim 1 wherein the pigtail fastener is composed of spring steel.

3. The pigtail fastener of claim 1 wherein the coiled portion is constructed and arranged to provide a biasing force against the shaft.

4. The pigtail fastener of claim 1 wherein the coiled portion has a lip portion which protrudes away from the shaft.

5. The pigtail fastener of claim 1 wherein the coiled portion and the shaft are separated by a gap.

6. The pigtail fastener of claim 1 wherein the shaft has a predetermined diameter, a region of the coiled portion having a diameter less than the predetermined diameter of the shaft.

7. The pigtail fastener of claim 1 wherein the coiled portion is characterized as having an initial diameter region and a reduced diameter region, the reduced diameter region having a diameter less than the initial diameter region, the reduced diameter region defining about 400 degrees of the arc of about 540 degrees or more.

8. The pigtail fastener of claim 1 wherein a region of the coiled portion is characterized as being flat.

9. A fishhook comprising a proximal portion and a distal portion, the proximal portion defining a hook region, the hook region including a distally extending shaft, the distal portion defining a coiled portion extending from a distal end of the shaft, the coiled portion being adjacent to the shaft, said coiled portion defining an arc of 540 degrees or more, a distal end of the fishhook defining an apex at the coiled portion, a line securement area being positioned at the apex, the line securement area defining a channel between two adjacent loops of the coiled portion, the channel defining a channel axis, the shaft defining a longitudinal axis, the coiled portion disposed about a coil axis, the longitudinal axis and the coil axis being substantially perpendicular to one another, the longitudinal axis and the channel axis being substantially parallel to one another.

10. The fishhook of claim 9 wherein the coiled portion is constructed and arranged to provide a biasing force against the shaft.

11. The fishhook of claim 9 wherein the coiled portion and the proximal end of the shaft are separated by a gap.

12. The fishhook of claim 9 wherein the pigtail fastener is composed of spring steel.

13. The fishhook of claim 9 wherein the coiled portion has a lip portion which protrudes away from the proximal end of the shaft.

14. A pigtail fastener comprising a rod having a proximal portion and a distal portion, the proximal portion defining a shaft, the shaft defining a longitudinal axis, the distal portion of the rod defining a coiled portion which extends from a distal end of the shaft, and is adjacent to the shaft rod, the coiled portion being defined by an arc of about 540 degrees or more disposed about a coil axis, the coiled portion having an initial diameter region and a reduced diameter region, the reduced diameter region extending from the initial diameter region, the reduced diameter region characterized as being flattened relative to the initial diameter region, the initial diameter region having a predetermined diameter, the reduced diameter region having a diameter less than that of the predetermined diameter of the initial diameter region.

* * * * *